June 5, 1923.
W. W. KNIGHT
1,458,099
SIGNAL SYSTEM FOR VEHICLES
Filed April 12, 1922
4 Sheets-Sheet 1
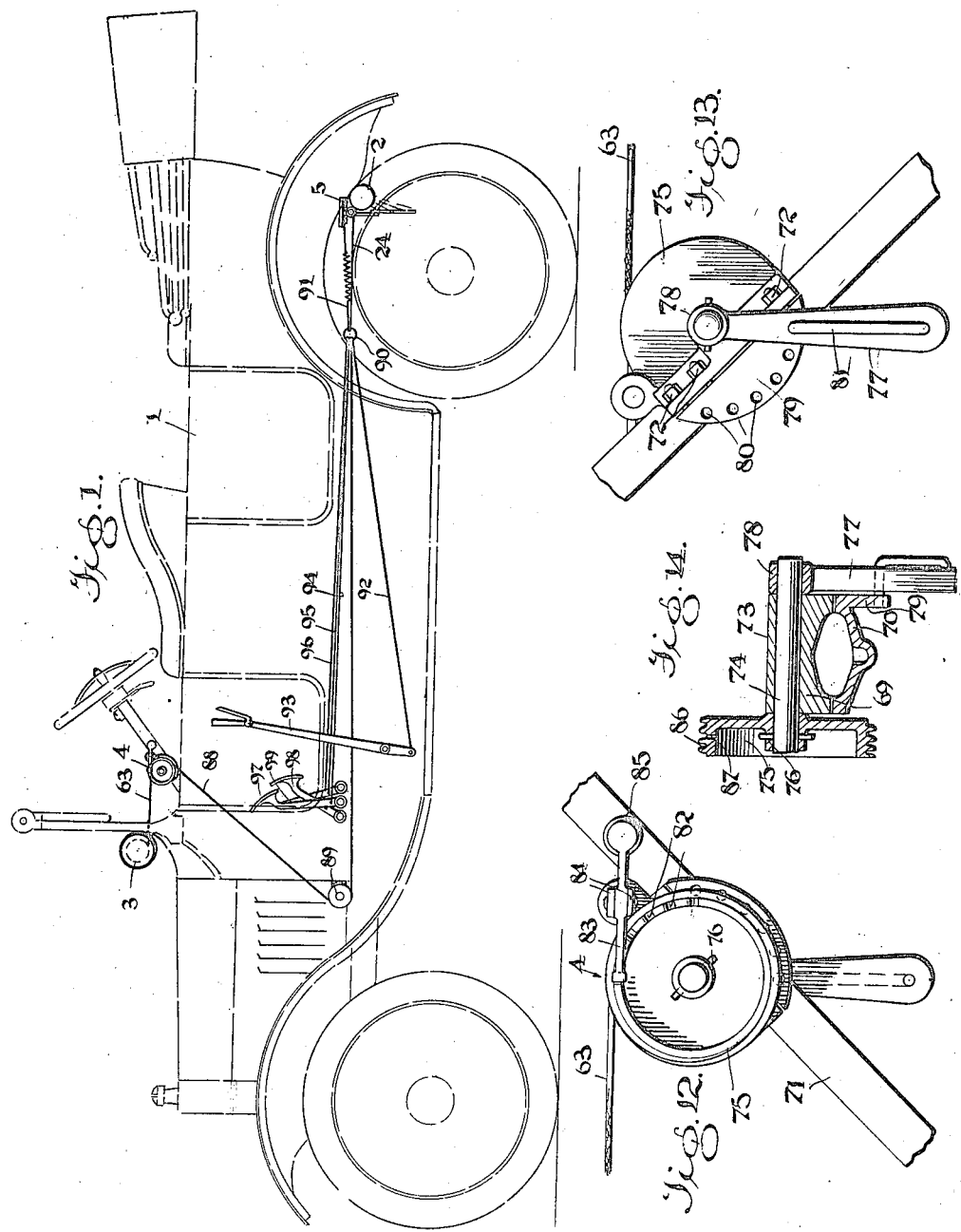

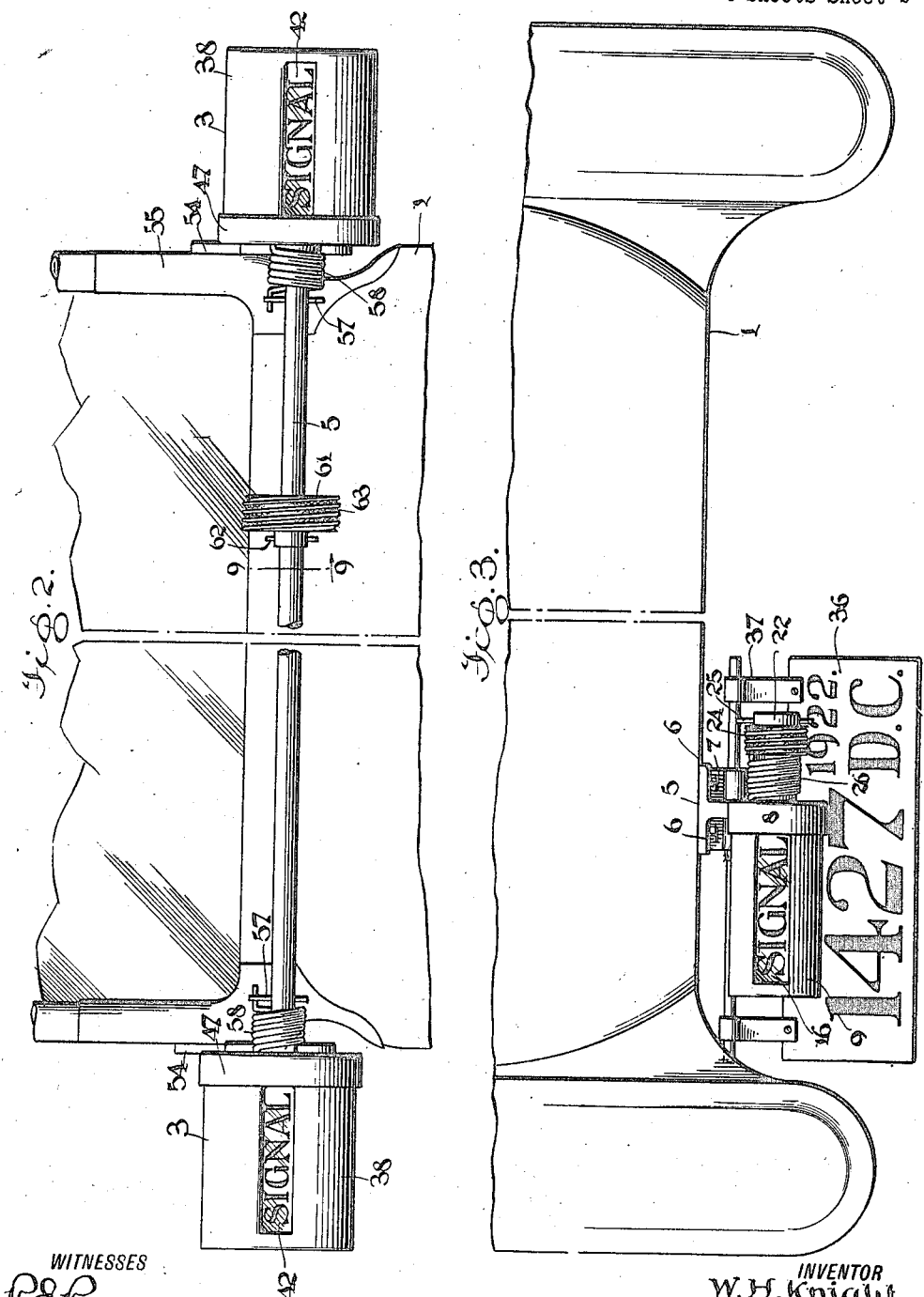

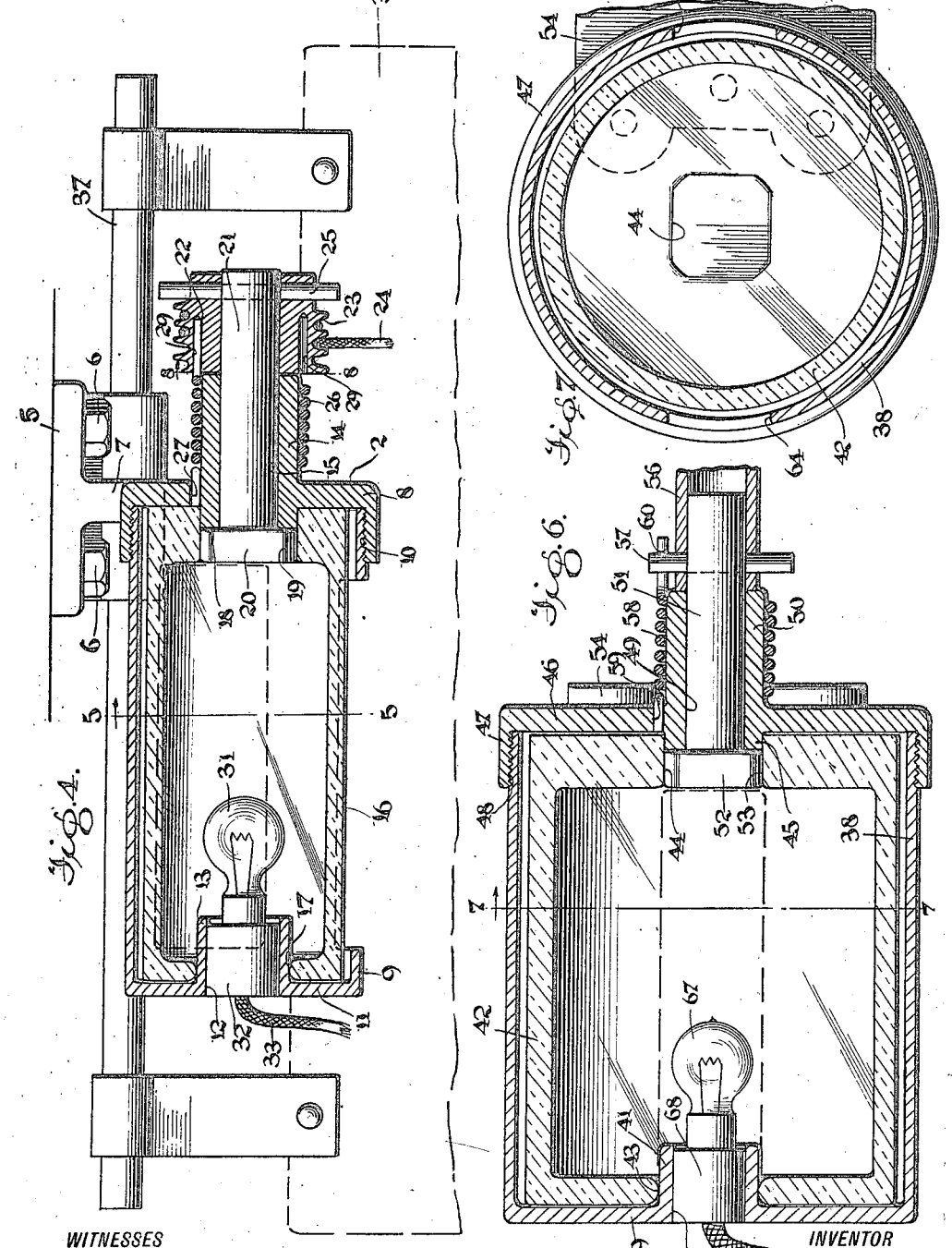

June 5, 1923.
W. W. KNIGHT
1,458,099
SIGNAL SYSTEM FOR VEHICLES
Filed April 12, 1922 4 Sheets-Sheet 4
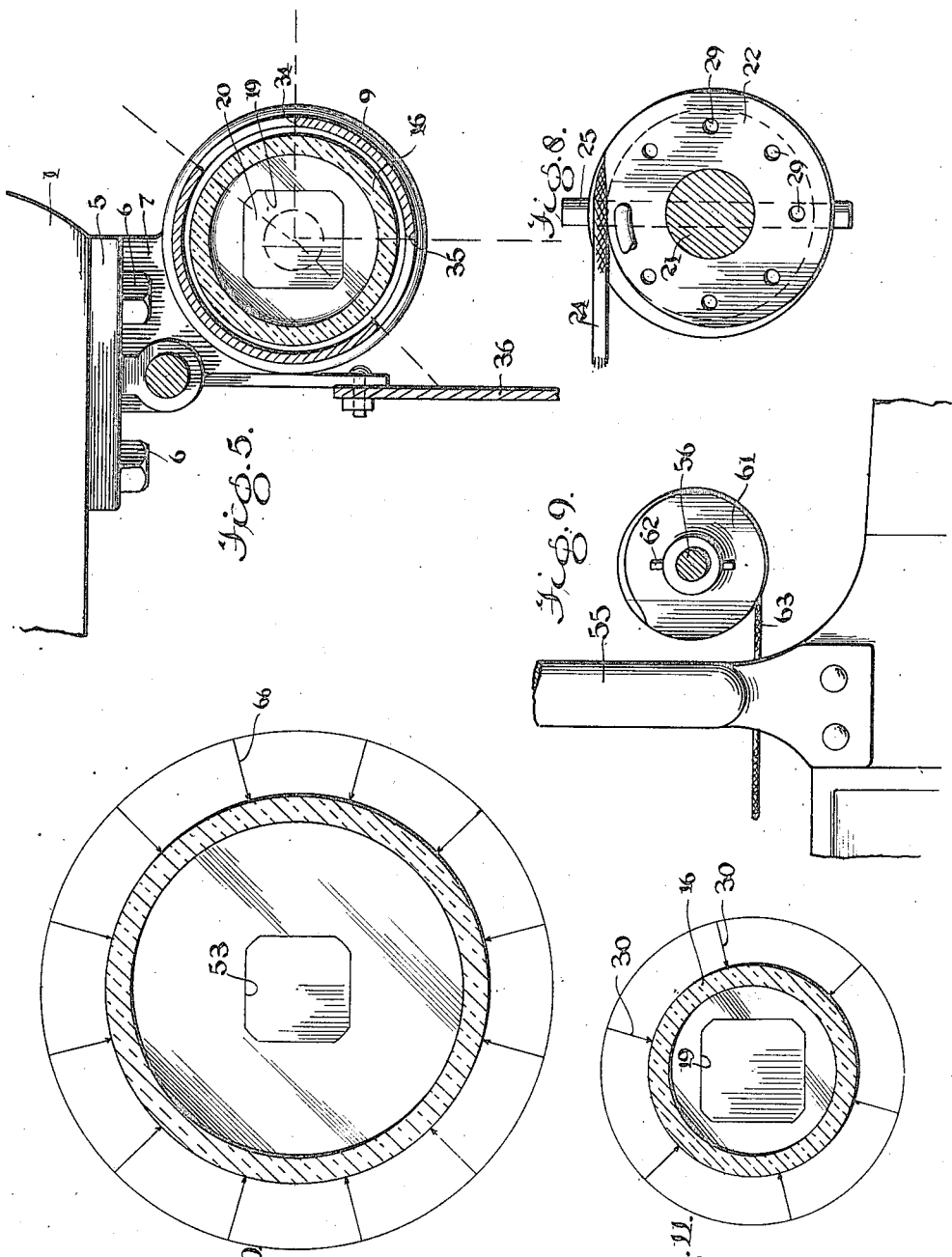
WITNESSES
R. E. Rousseau
INVENTOR
W. W. Knight,
BY
ATTORNEYS Patented June 5, 1923.

1,458,099

UNITED STATES PATENT OFFICE.

WILLIAM WALTER KNIGHT, OF BIRMINGHAM, ALABAMA.

SIGNAL SYSTEM FOR VEHICLES.

Application filed April 12, 1922. Serial No. 551,824.

*To all whom it may concern:*

Be it known that I, WILLIAM W. KNIGHT, a citizen of the United States, and resident of Birmingham, in the county of Jefferson and State of Alabama, have invented certain new and useful Improvements in Signal Systems for Vehicles, of which the following is a specification.

My invention relates to signal systems for vehicles and consists in the combinations, constructions and arrangements herein described and claimed.

An object of my invention is to provide a relatively simple and efficient signal system for motor vehicles which system is operable to simultaneously present visible signals and give audible signals, the visible signals being such as will indicate to interested persons the intentions of the driver of a vehicle to which the system is applied at given times, as to contemplated movement of the vehicle.

A further object of my invention is to provide a system of the character described which is adapted to be applied to motor vehicles of various known types of construction with but slight changes, if any, being required in the usual construction of the vehicle to which applied and of the system.

A still further object of my invention is to provide a system of the character described which can be operated by the driver of a vehicle to which applied without in any way interfering with the operation of the vehicle in the usual manner.

Other objects and advantages will be apparent from the following description, and the novel features of the invention will be particularly outlined in the appended claims.

My invention is illustrated in the accompanying drawings, forming a part of this application, in which—

Figure 1 is a view, showing more or less diagrammatically an automobile of a well known type of construction equipped with a signal system embodying the invention, Figure 2 is an enlarged fragmentary view, showing a portion of the front part of the vehicle together with certain of the elements applied thereto and comprised in the system, Figure 3 is a view similar to Figure 2 showing a portion of the rear part of the vehicle, together with the elements of the system which are arranged at the rear of the vehicle, Figure 4 is a longitudinal vertical section through the elements exhibited in Figure 3, Figure 5 is a section substantially along the line 5—5 of Figure 4, Figure 6 is an enlarged longitudinal section through certain of the elements of the system exhibited in Figure 2, Figure 7 is a section substantially along the line 7—7 of Figure 6, Figure 8 is a section along the line 8—8 of Figure 4, Figure 9 is a section substantially along the line 9—9 of Figure 2, Figure 10 is a transverse section through a signal indicating member included in the elements of the system exhibited in Figure 2, Figure 11 is a section through a signal indicating member included in the elements of the system exhibited in Figure 3, Figure 12 is a side elevation showing a fragmentary portion of the steering post of the vehicle illustrated in Figure 1 together with a portion of the control mechanism comprised in the system and attached to the steering post, Figure 13 is a view similar to Figure 12 showing the side of the portion of the control mechanism opposite to that exhibited in Figure 12, Figure 14 is a longitudinal section through the portion of the control mechanism exhibited in Figures 12 and 13, detached from the steering post.

In the accompanying drawings I have illustrated a signal system embodying the invention and in Figure 1 of the drawings, the invention is shown applied to a vehicle of the Ford type of construction. Obviously, the application of my device is not limited to vehicles of the type illustrated but may be applied to vehicles of any usual known type of construction.

My invention provides signal devices at the rear and sides of the vehicle which comprise members each having a plurality of visible signal giving indicia thereon, and the control means for operating the signals of the system is so constituted and arranged as to actuate the rear and side signals to present the same signal giving indicia at the same time and to actuate the means for producing audible signals to give different audible signals coincidentally with the presentation of the several visible signal indicia.

In Figure 1, an automobile equipped with a system embodying the invention is indicated generally at 1. The system includes a signal device indicated generally at 2 and positioned at the rear of the automobile, signal devices, such as indicated generally at 3 and positioned at opposite sides of the automobile body and adjacent to the front end of the latter, as best seen in Figure 2, and a control mechanism generally indicated at 4, for controlling the operations of the signal devices 2 and 3 and a means not shown for creating an audible signal.

The rear signal 2 includes a bracket 5 adapted to be attached to the lower rear part of the automobile body by means of bolts 6 or like fastening means. The bracket 5 is provided with a rearwardly extending bracket arm 7 fashioned to provide a lateral socket 8 with which an end portion of a substantially cylindrical casing 9 is threadedly engaged at 10. The casing 9 is provided at its end remote from the bracket arm 7 with an inwardly extending annular head or flange 11 defining a central opening 12 having an integral tubular extension 13 extending from the opening 12 interiorly of the casing.

The socket portion 8 of the bracket arm is provided with an integral central boss 14 which extends both interiorly and exteriorly of the casing and is provided with a longitudinally extending bore 15 which is axially aligned with the tubular extension 13 and is concentric with the casing 9. A substantially cylindrical indicator member 16 is rotatably supported at its ends, as at 17 and 18 respectively upon the tubular extension 13 and the internal portion of the boss 14. It is to be observed at this point that the end portion 18 of the indicator member has a thickness considerably greater than the length of the portion of the boss 14 extending interiorly of the casing and the portion of the bore through the end 18 at the inner end of the boss 14 is fashioned to be non-circular in sectional contour, as indicated at 19 and to receive the non-circular head 20 of a stub shaft 21 which is journaled in the bore 15 of the boss 14 and extends beyond the outer end of the latter. The arrangement is such that the indicator member 16 is held to rotate with the shaft 21.

A drum or reel 22 provided with a continuous peripheral groove 23 adapted to receive a cable 24 is secured to the shaft 21 at the outer end of the boss 14 by means of a locking pin 25 which is diametrically disposed with respect to the shaft 21 and the encircling reel or drum and is of such length that the ends thereof extend beyond the peripheral wall of the reel or drum. The cable 24 is arranged in the groove 23 in encircling relation to the reel or drum and is secured at one end to the pin 25. A torsion spring 26 is coiled about the external portion of the boss 14 and has one end disposed in a seat or socket 27 in the socket member 8. The outer end portion 28 of the torsion spring is adapted to be disposed in any selected one of a plurality of sockets 29 provided in the end of the reel or drum approximate to the socket member 8, whereby the torque imparted to the reel or drum by the torsion spring 26 may be varied.

The indicator member 16 is made of any suitable transparent or translucent material, such as clear glass or frosted glass, and the outer diameter thereof is less than the inner diameter of the casing 9 so that the peripheral wall of the indicator member is spaced from the inner wall of the casing. A plurality of signals are produced upon the peripheral wall of the indicator member 16 and in the form of the device now preferred by me, these signals consist of the words "Signal", "Slow", "Stop", "Back", "Left", and "Right", these words being spaced apart so that each word is arranged to extend longitudinally of the indicator member within the limit defined by adjacent arrows 30 in Fig. 11 of the drawings. A source of light, such as an incandescent lamp 31, is disposed within the indicator member 16. The incandescent lamp 31 is held by a socket 32 interfitting the opening 12 and the bore of the tubular extension 13. A conductor 33 for supplying an electric current to the lamp 31 may lead to any suitable source of electric current supply and may be provided with any suitable known means for controlling the energization of the lamp 31.

The casing 9 is provided with two longitudinally extending openings 34 and 35 respectively. The width of the opening 34 is substantially the same as the distance between adjacent arrows 30 in Figure 11 and the opening 34 is located in the rear part of the casing 9 in position to expose to view the signal indicia upon the indicator member 16 when the latter has been rotated to a plurality of positions selectively. The opening 35 is formed through the lower part of the casing 9 so that rays of light from the lamp 31 projected therethrough will strike and illuminate the face of a license plate 36 which depends in the usual position from the bracket 5, being attached to the latter by means of suspension members 37.

It is intended that the signal indicia and the back ground of the same shall be of such colors as to be readily distinguishable in the day time when the source of light within the indicator member is inactive. The respective signal indicia may be produced in different colors in order that one may be distinguished readily from the others and any preferred colors may be employed, preferably such as will attract the attention of the observers to the signal which it is desired to give.

It will be apparent that a pull on the cable 24 will occasion the rotation of the indicator member 16 so that the respective signal indicia upon the indicator member may be presented selectively in the sight opening 34. When the pull upon the cable 24 is relaxed, the torsion spring 26 will rotate the indicator member to initial or neutral position.

Each of the side signal devices 3 includes a substantially cylindrical casing 38 formed with an integral head or end portion 39 provided with an axial opening 40 from which extends a tubular extension 41 interiorly of the casing. A substantially cylindrical indicator member 42 formed of clear or frosted glass or other transparent or translucent material is disposed within the casing and is rotatably supported at its ends, as at 43 and 44 respectively upon the tubular extension 41 and an internal boss 45 formed centrally of a socket comprising a head 46 having an annular flange 47 threaded interiorly for engagement at 48 with the end portion of the casing 38.

A bore 49 extends through the boss 45 and through an external boss 50 on the head 46 in axial alinement with the bore 40 and concentric with the casing 38. A stub shaft 51 journalled in the bore 49 has a head or enlarged inner end portion 52 of non-circular cross sectional contour fitted within a non-circular portion 53 of the central opening through the end 44 of the indicator member 42. As in the case of the rear signal, the arrangement is such that the indicator member 42 will rotate with the shaft 51. The head 46 and the flange 47 provide a socket member corresponding to the socket 8 heretofore described and the head 46 is provided with a bracket arm 54 whereby each signal 3 may be attached to the body of an automobile at a selected place In Figure 2, I show two of the signal devices 3 arranged at opposite sides of the automobile body and attached by means of the bracket arms 54 to the front part of the body adjacent to the windshield frame 55. The devices 3 at opposite sides of the vehicle are precisely identical, one with the other in essential respects, and are arranged with the stub shafts 51 thereof in axial alignment with each other and extending toward each other. A connecting member 56 is arranged with the ends thereof mounted upon the outer end portions of the shaft 51 and secured to the latter, by means of pins 57 projected transversely therethrough and being of such length that the ends thereof extend beyond the outer wall of the connecting member 56. A torsion spring 58 is provided for each of the signal devices 3 and is coiled about the boss 50 thereof with one end thereof disposed in a seat or opening 59 formed in the head 46 and the other end portion engaged with a transverse opening through a projecting end of the pin 57 as at 60. The arrangement is such that when the connecting member 56 is rotated, the indicator members of the signal devices 3 at the ends thereof will be rotated to a like extent and that when the force tending to rotate the connecting member 56 is removed therefrom, the torsion springs 58 will operate to return the indicator members 42 to initial or neutral position. A reel or drum 61 having a continuous peripheral groove is mounted upon the connecting member 56 intermediately of the signals 3 and is secured to this member 56, as at 62 to rotate therewith. A cable 63 having one end secured to the reel or drum 61 is arranged in the groove of the latter in encircling relation to the reel or drum and extends through an opening in the windshield frame or other part of the body of the vehicle to a control member positioned adjacent to the driver of the automobile, which control member will be hereinafter described in detail.

Each casing 38 is provided with directly opposite or horizontally aligned openings 64 and 65 respectively, which openings extend longitudinally of the casing and are of a width indicated by the spacing of the arrows 66 in Figure 10 of the drawing. The indicator member 42 of each signal member 3 has produced upon the periphery thereof a double set of the signal words heretofore mentioned as being provided upon the indicator member 16 of the rear signal. The arrangement is such that when a selected one of the signal words is presented to view through the opening 64, the same signal word will be presented to view on the opposite side of the indicator member through the opening 65. Since the signal devices 3 project laterally of the body of the automobile to which applied, it will be readily apparent that the same signal words or other indicia will be exposed to view through the sight openings 64 and 65 to persons at the front and rear of the vehicle. A light emitting member 67 is provided for each of the signals 3 and in the form of the device illustrated, is an incandescent lamp held within a socket 68 disposed within the tubular extension 51 and the opening 40 of the head 39. The lamp or other light emitting member 67 may be controlled and operated in any suitable known manner, no means being shown therefor in the accompanying drawings.

Referring now particularly to Figures 12, 13 and 14 of the drawings, I show elements of the control mechanism comprised in the system. The control mechanism includes a clamp consisting of complementary members 69 and 70 adapted to embrace the steering post 71 of the automobile when connected together by means of bolts 72 or the like. The clamp member 69 is provided with an integral bearing portion 73 in which is journaled a stub shaft 74 having its ends extending beyond the ends of the bearing. A drum or reel 75 is mounted upon one end portion of the shaft 74 and is secured thereto at 76. A control arm 77 has a hub portion 78 at one end secured to the end portion of the shaft 74 remote from the reel or drum 75. The control arm 77 is arranged to move over the face of a sector 79 which is formed integrally with the clamp member 70. The sector 79 is provided with a series of openings 80 extending adjacent to the edge thereof and adapted to engage a latch spring 81 carried by the control arm. The control arm 77 may thus be releasably locked in adjusted position in respect to the sector 79.

The drum or reel 75 has a series of cams 82 extending from one end thereof in position to engage one end of a lever 83 which is pivoted intermediately of its ends between a pair of spaced lugs 84—84 which are formed integrally with the clamp member 69. The end of the lever 83 remote from that engaged by the cam projections 82 is adapted to actuate a push button indicated at 85 each time the end of the lever rides over one of the cam projections. It is intended that the push button 85, which is shown as being carried by the steering post 71, shall control the operation of a means, such as a horn, not shown, for giving an audible signal each time the push button is depressed or actuated by the lever 83.

The cable 63 is arranged in a groove 86 in the periphery of the drum 75 and has the end thereof remote from the connecting member 56 secured to the drum 75, as by being projected through an opening 87 in the latter. A cable 88 is secured at one end to the drum or reel 75 and after being wound about the latter in the groove 86 is extended around an idler pulley 89 supported upon the automobile 1 in advance of the drum 75 and is attached at its end remote from the drum 75 to a ring 90 which is connected by a retractile spring 91 to the bracket 5 or to any other suitable support carried by the automobile. The cable 24 has the end thereof remote from the signal 2 attached to the ring 90. A control cable 92 leads from the ring 90 to the emergency control lever 93. Control cables 94, 95 and 96 respectively lead from the ring 90 to the pedal control members 97, 98 and 99, which pedals are ordinarily provided in an automobile of the type of construction illustrated.

From the foregoing description of the various parts of the device, the operation thereof may be readily understood. The spring 91 is sufficiently strong to overcome the resistance of the torsion springs 58 of the side signal devices and to move the cables 88—63 under the control of the control cables 92, 94, 95, 96 and the control arm 77.

In Figure 1, the automobile 1 is pictured with the pedals thereof and the emergency lever 93 in the positions occupied when the automobile is moving at a relatively high speed.

The pedals 97, 98 and 99 are at their extreme backward position and the spring 91 holds the cables 94, 95, and 96 to the limit of travel of these cables toward the rear signal. Cable 92 is likewise held by the action of the spring 91. At this time, the word "Signal" is disclosed to view by the rear signal device 2 and each of the side signal devices 3. In the event that the driver desires to slacken the speed of the automobile, the pedal 97 is depressed to exert a pull on the cable 94 so as to rotate the indicator member of the rear signal until the word "Slow" is displayed to view through the opening 34. The pull on the cable 94 will result in a slight relaxation of the pull on the cables 88 and 63, whereby the torsion springs of the side signal devices will be permitted to operate the indicator members of the side signals to present the word "Slow" at the openings 64 and 65 of each side signal device 3. The relaxation of the tension on the cables 88 and 63 and the pull thereon by the torsion springs of the side signal devices will result in a rotation of the reel or drum 75, which will result in the lever 83 being actuated on account of contact with the relatively moving cam projections 82 and the push button 85 will be operated to actuate a horn or other means for giving an audible signal. It is to be noted at this point that the arm 77 will be moved relatively to the sector when the drum or reel 75 is rotated in the manner described. The latch spring 81 is normally disengaged from the openings 80 so as not to prevent movement of the arm 77 when the drum 75 is rotated on account of the manipulation of one of the control members of the automobile in the manner described.

From the foregoing it is believed that the manner of operating the rear signal 2, the side signals 3 and the horn or like signal, not shown, by means of the pedals 97, 98 and 99 or by means of the emergency control lever 93 to position the appropriate signal word provided in the visible signal devices in position to be viewed through the sight opening and to occasion the operation of the audible signal occasioning means will be understood without further explanation herein. In the event that it is desired to turn to the left or right without varying the speed of the automobile, the control arm 77 is moved until the indicator members of the several visible signals have been rotated to present the signal words to view and is locked in that position by the latch 81. The movement of the arm 77 will cause a rotation of the drum or reel 75 and in consequence the audible signal occasioning means will be actuated by the means described. The number of times that the push button 85 will be actuated during the operation of the rear and front signals in the manner described will vary with the visible signal presented so that the number of audible signal composing sounds given coincidentally with the presentation of each visible signal will vary with the particular visible signal.

Obviously, my invention is susceptible of embodiment in forms other than that in which illustrated in the accompanying drawings, and I therefore consider as my own all modifications and adaptations thereof which fairly fall within the scope of the appended claims.

Having thus described the invention, what I claim is:—

1. In a signal system, a device for giving a plurality of visible signals, and means for operating the signal device to present the visible signals selectively and to actuate a device for producing audible signals coincidentally with the presentation of the visible signals and in such manner that the extent of the audible signal produced varies with the visible signal presented.

2. A signal system for motor vehicles comprising a device operable to give a plurality of visible signals and means for actuating the visible signal giving device and for actuating a device for occasioning audible signals, and in such manner that the extent of the audible signal produced varies with the visible signal presented.

3. A signal system of the class described for motor vehicles comprising a signal device adapted to be positioned at the rear end of a motor vehicle, other signal devices adapted to be positioned at the sides of the motor vehicle, said signal devices being adapted to present a plurality of desired visible signals, and means for operating the said visible signal devices to occasion the giving of like visible signals by the several devices and to actuate an audible signal giving device of the motor vehicle coincidentally with the presentation of the visible signals so that audible signals of different extent will be given for the different visible signals.

4. In a device of the character described, a rotatably supported drum, an indicator member connected with the drum and arranged to rotate therewith, a second drum rotatably supported at a distance from the first drum, flexible means operatively connecting the two drums, manually operable means for rotating the second drum, and means operated by the operation of the second drum for actuating a push button controlled device, as and for the purpose described.

5. In a device of the character described, a rotatably supported drum, an indicator member connected with the drum and arranged to rotate therewith, a second drum rotatably supported at a distance from the first drum, flexible means operatively connecting the two drums, manually operable means for rotating the second drum, a push button positioned adjacent to the second drum, a series of cam projections extending from the drum, and an intermediately fulcrumed lever member having one end in engagement with the cam projections and the other end thereof in contact with the push button, whereby the push button will be operated when the second named drum is rotated.

WILLIAM WALTER KNIGHT.